United States Patent [19]
Pitman, I

[11] Patent Number: 5,636,699
[45] Date of Patent: Jun. 10, 1997

[54] MOBILE HAULING VEHICLE

[76] Inventor: Samuel D. Pitman, I, P.O. Box 671, 102 N. East St., Hartford City, Ind. 47348

[21] Appl. No.: 507,119
[22] Filed: Jul. 26, 1995
[51] Int. Cl.⁶ .................................................. B62D 61/10
[52] U.S. Cl. ......................... 175/203; 180/24.08
[58] Field of Search ................ 180/24.08, 6.7; 175/162, 203

[56] References Cited

U.S. PATENT DOCUMENTS

| | | | |
|---|---|---|---|
| 2,878,883 | 3/1959 | France et al. | 180/24.08 |
| 3,405,222 | 10/1968 | Ohlson | 180/23 |
| 3,506,079 | 4/1970 | Madler et al. | 180/22 |
| 3,863,973 | 2/1975 | Ross | 294/74 |
| 4,202,416 | 5/1980 | Blaschke et al. | 175/94 |
| 4,314,712 | 2/1982 | Owen et al. | 280/404 |
| 4,561,671 | 12/1985 | DeWitt et al. | 280/404 |
| 4,718,509 | 1/1988 | Ehrlinger et al. | 180/24.08 |
| 4,729,444 | 3/1988 | Tubman | 180/9.22 |
| 4,782,906 | 11/1988 | Kole | 180/24.08 |

Primary Examiner—William P. Neuder
Attorney, Agent, or Firm—Lundy and Associates

[57] ABSTRACT

A self-propelled hauling vehicle is disclosed. The vehicle has three main axles with two wheels per axle for a total of six wheels. Optional wheels can be added onto each axle for increased stability and also to reduce the pressure per wheel. The vehicle is sized to have a width of approximately thirty-four inches allowing the vehicle to fit through narrow spaces. Optional tracks can cover the wheels when needed. An extension crane with extendable hydraulic cylinders and pistons can raise and lower loads such as telephone poles and the like. The invention includes a storage platform thereon. The crane can include a conventional winch and pulley assembly with hooks. Optionally an auger can be suspended and operated by the end of the crane. The vehicle can include extendable stabilizer arms and foot pads for increased stability. The arms can be detachable when not used. An operator can control the vehicle by walking behind the vehicle and controlling the vehicles speeds, and other functions.

25 Claims, 7 Drawing Sheets

MOBILE HAULING VEHICLE

This invention relates to a transport vehicle, and in particular to a self propelled mobile hauling vehicle with six wheel drive train assembly, extendable crane and storage platform that a user can control by walking behind the vehicle.

BACKGROUND AND PRIOR ART

Due to their large size and weights, traditional tractors, cranes and the like are not designed for use on properties where conditions such as sandy soil, backyards, wooded areas and even creek bottoms need to be traversed. Many commercial devices are over sized and/or only support their own weight by using single wheels on the ends of each axle. For example, regular cranes weighing several tons can sink and become trapped in sandy soils and creek bottoms. The weights of traditional cranes can also destroy curbs, sidewalks, and driveways. Further, the weight of traditional type cranes and tractors on single wheels can cause deep unsightly channels in the landscaped areas on front yards and backyards of residential and commercial yards. Damage to the ground turf results in added expense to fix these problems. Further, the large size of traditional tractors and trailers does not allow for passing through regular gate openings and other narrow spaces. Many smaller projects such as moving a single wooden pole make using a large industrial crane or tractor also cost prohibitive.

Thus, the need exists for a compact mobile hauling vehicle that avoids the problems of the prior art.

SUMMARY OF THE INVENTION

The first objective of the present invention is to provide a mobile hauling vehicle capable of safely and effectively traversing soft land conditions such as sandy soil and creek bottoms.

The second object of this invention is to provide a mobile hauling vehicle capable of traversing narrow openings of less than approximately a three feet width.

The third object of this invention is to provide a mobile hauling vehicle that has a low center of gravity for enhanced stability.

The fourth object of this invention is to provide a mobile hauling vehicle that has removable outer wheels to reduce vehicle width.

The fifth object of this invention is to provide a mobile hauling vehicle that uses interchangeable wheels.

The sixth object of this invention is to provide a mobile hauling vehicle that can alternatively use tracks over the wheels.

The seventh object of this invention is to provide a mobile hauling vehicle that is self-propelled with its own power source.

The eighth object of this invention is to provide a mobile hauling vehicle with storage areas for transporting a load.

The ninth object of this invention is to provide a mobile hauling vehicle with an extendable crane arm for suspending and/or being able to position a load.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
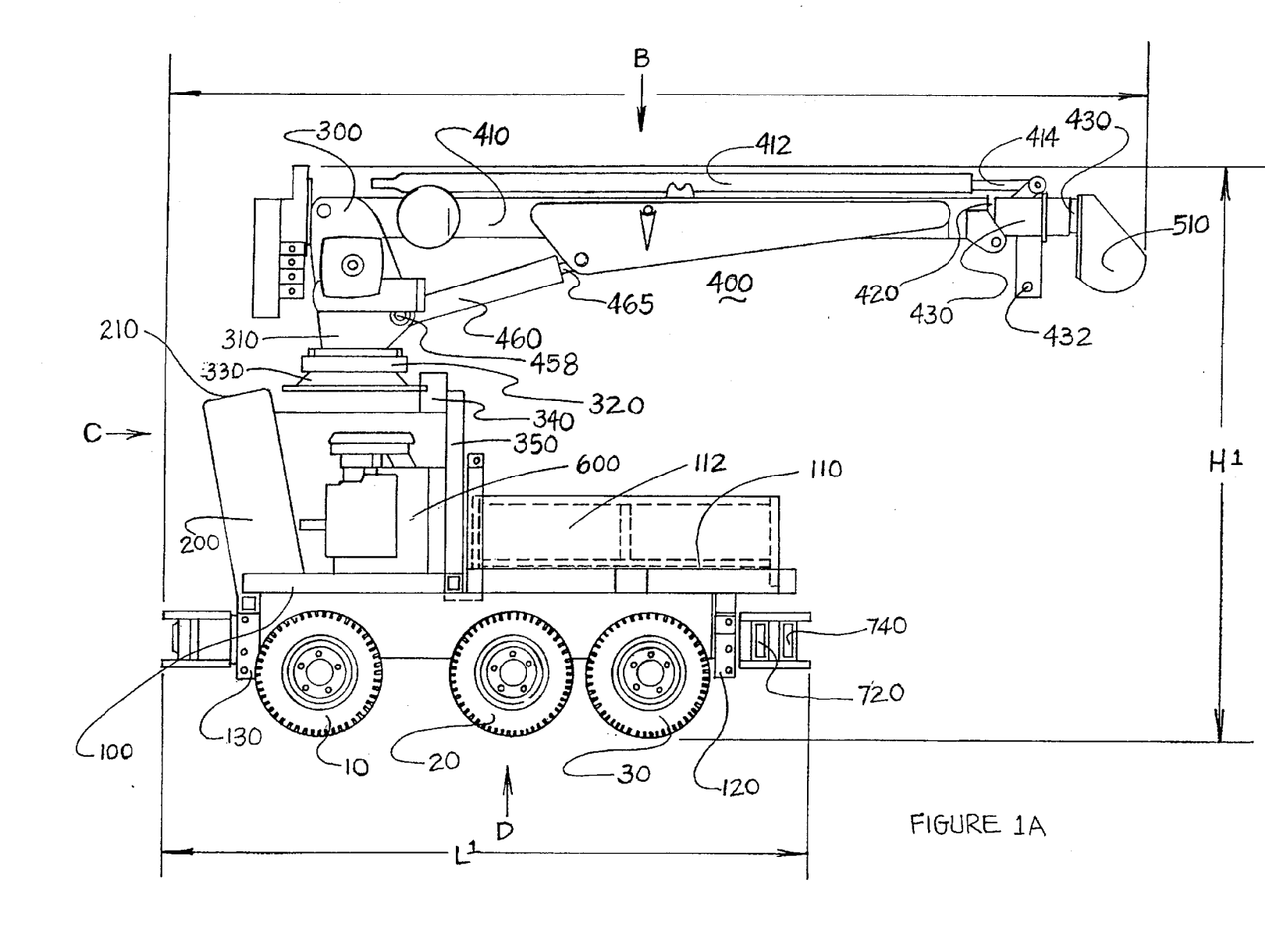
FIG. 1A illustrates a side view of a first embodiment of the self-propelled hauler invention.

FIG. 1A illustrates a side view of a first embodiment of the self-propelled hauler invention. FIG. 2 shows an enlarged bottom view of the invention depicted in FIG. 1A. Referring to FIGS. 1A and 2, the invention includes steel base frame member 100 having a length, L1, of approximately seventy-five inches. The overall components of the invention combined together have an overall weight of approximately thirty-two hundred pounds. The invention has a maximum height, H1, from the bottom of the wheels 10–65 to the top of crane 510 of approximately seventy-three inches. Fixably mounted axle members 12, 22, 32, 42, 52, 62 each respectively include six side wheels 10 through 60. The first width, W1, of the invention is approximately thirty-four inches (see FIG. 1C). Extra outer wheels, 15, 25, 35, 45, 55 and 65 can be detachably attached on the outside of wheels 10 through 60 respectively creating dual wheels on the ends of each axle. With the extra detachable wheels, the invention would have an enlarged width, W2, of approximately forty-eight inches (See FIG. 1C). By having dual wheels on the ends of each axle less ground pressure occurs as compared to single wheels thus resulting in little or no damage to landscaped grounds. Element 110 refers to the flat bed portion of the invention. Flat bed portion 110 can be used to store cargo with conventional type fasteners (not shown) such as but not limited to cables and straps.

Figure 1B:
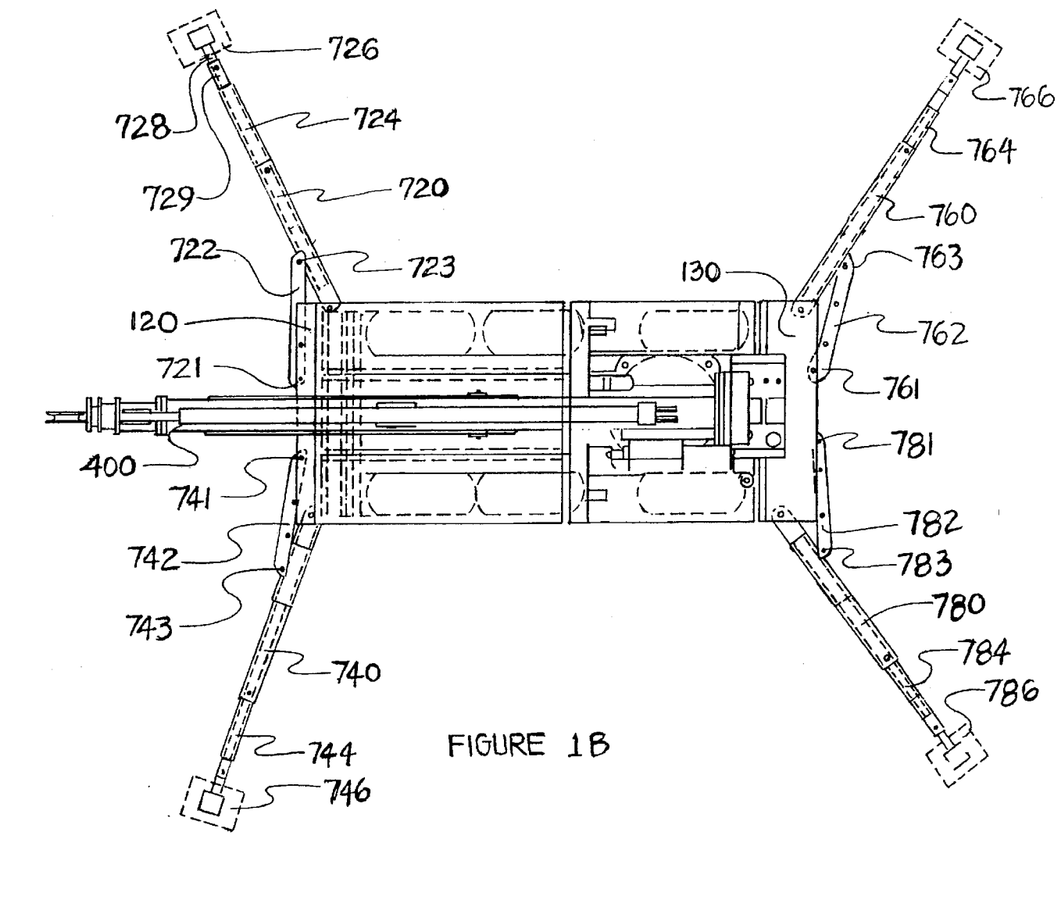
FIG. 1B is a top view of the invention of FIG. 1A along arrow B with extended stabilizer arm jacks extended out therefrom.

FIG. 1B is a top view of the invention of FIG. 1A along arrow B with extended stabilizer arm jacks 720, 740, 760, 780 extended out therefrom. Front bumper 120 has linkage 722 with rotating hinge ends 721, 723. Hydraulic cylinder 720 is connected to hinge end 723 and contains piston 724 that extends outward which is connected to a footer 726. Footer 726 is connected to hydraulic cylinder 729 and piston 728 (more clearly shown in FIG. 6). Referring to FIG. 1B, bumper 120 contains like linkage 742, rotating hinge ends 741, 743, hydraulic cylinder 740, piston 744 and footer 746.

Rear bumper 130 contains like stabilizer arm components 780–786, 760–766 that operate similarly. Footers 726, 746, 766, and 786 stabilize the invention on uneven terrains.

Figure 1C:
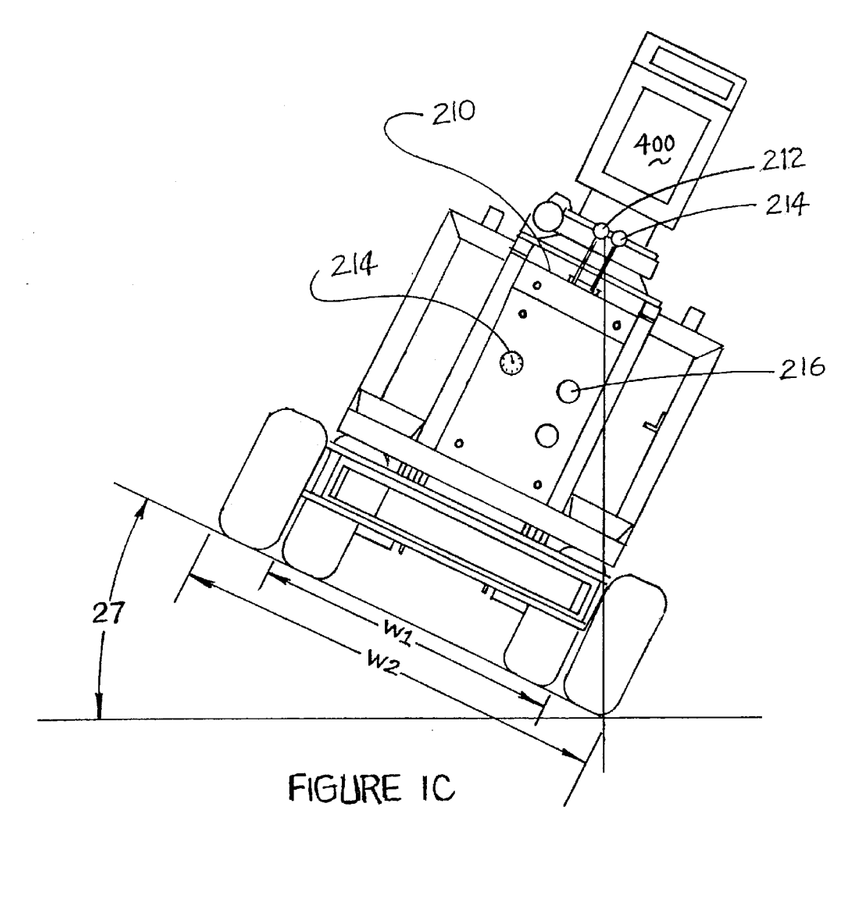
FIG. 1C is a rear view of the invention of FIG. 1A along arrow C.
Figure 2:
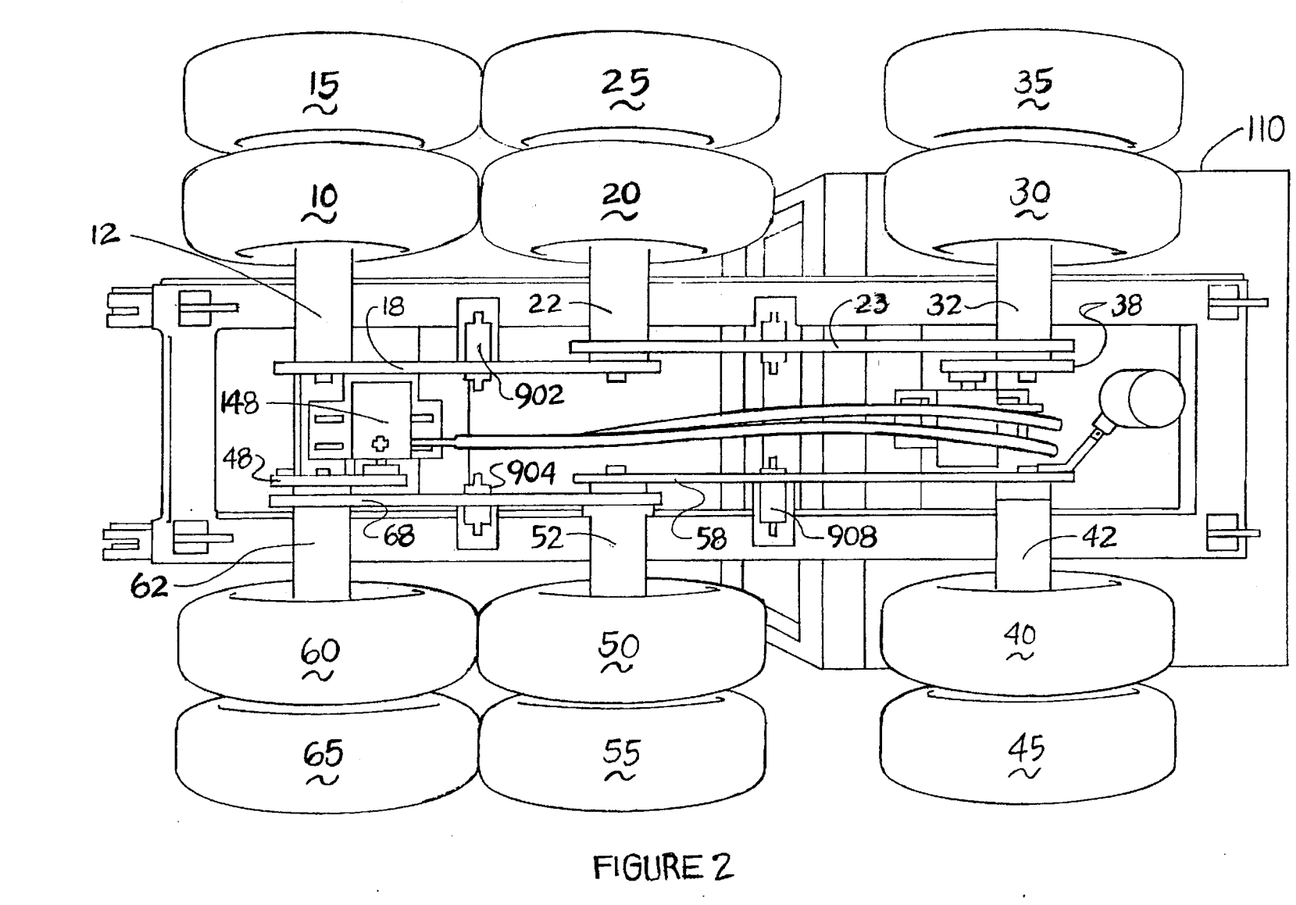
FIG. 2 is an enlarged bottom view of the invention depicted in FIG. 1A with dual wheels.

FIG. 1C is a rear view of the invention of FIG. 1A along arrow C. An operator, not shown, can walk behind to operate the hauler invention. Control panel 210 contains left side lever 212 and right side lever 214. Each lever 212, 214 controls wheel speeds by respectively delivering hydraulic flow to the hydraulic motors 138 and 148 to be discussed later. Panel 210 includes assorted gages such as 214 which can be amp gage, and 216 which can be a time gage. Separate controls for extending and raising the crane 400, stabilizer arm jacks 720, 780, 740, 760, and 780 can also be provided as needed.

Figure 3A:
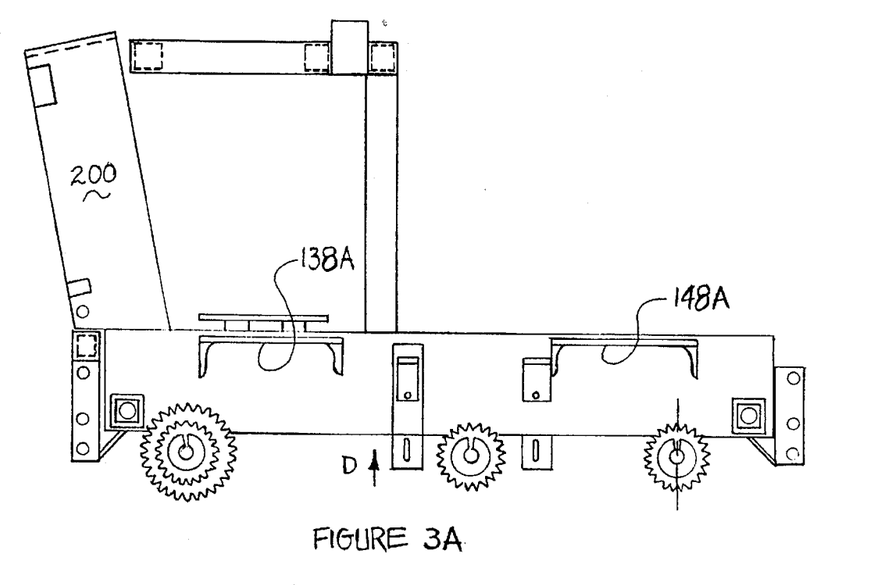
FIG. 3A is a side view of the carriage assembly with sprockets of the invention of FIG. 1A.
Figure 3B:
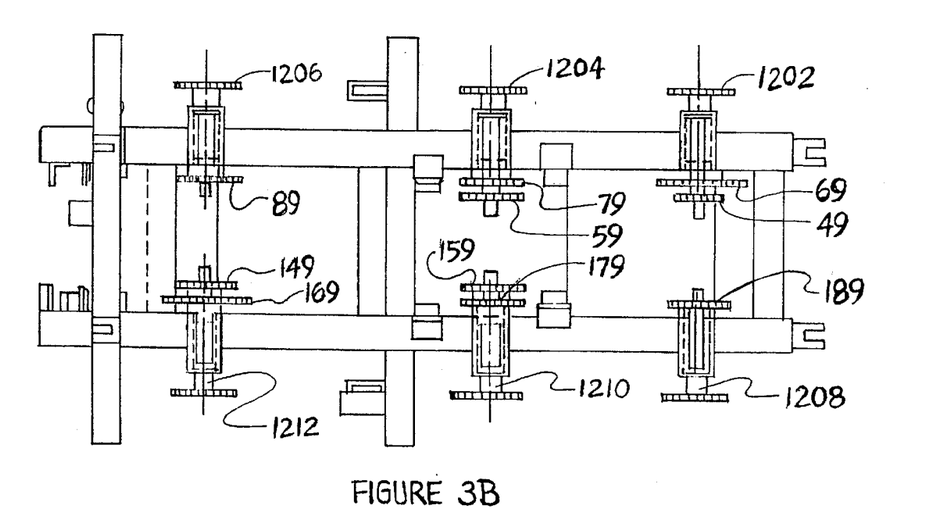
FIG. 3B is a bottom view of the carriage assembly of FIG. 1A along arrow D.

FIG. 2 is an enlarged bottom view of the invention depicted in FIG. 1A with dual wheels on the axles. FIG. 3A is a side view of the carriage assembly with sprockets of the invention of FIG. 1A. FIG. 3B is a bottom view of the carriage assembly of FIG. 1A along arrow D.

The operation of the wheels will now be discussed in relation to FIGS. 2, 3A and 3B. Hydraulic motors are illustrated as components 148 and 138. Sprockets are illustrated as components 49, 69, 59, 79, 89, 138, 148, 149, 169, 159, 179 and 189. Idlers are illustrated as components 902, 904, 906 and 908. Hydraulic motor 148 delivers power by chain 48 to sprocket 69 which rotates sprocket 49 which delivers power by its respective chain to sprocket 59 which in turn rotates sprocket 79 which delivers power by chain to sprocket 89. Hydraulic motor 138 delivers power by respective chain 38 to sprocket 169 which rotates sprocket 149 which delivers power by respective chain to sprocket 159 which rotates sprocket 179 which delivers power by respective chain to sprocket 189. The respective chains rotate the wheels. For example, chain 18 rotates respective wheels 10 and 15. Chain 28 can rotate wheel pairs 20 and 25 and wheel pairs 10 and 15. Chain 38 can rotate wheel pairs 30 and 35 as well as wheel pairs 10, 15 and 20, 25. Chain 48 can rotate all respective wheel pairs 60, 65 and 50, 55 and 40, 45. Chain 58 can rotate respective wheel pairs 50, 55 and 60, 65. Chains are fastened together with a standard chain master link where idlers 902, 904, 906 and 908 apply pressure for tension to secure the respective chain to corresponding sprockets. Hydraulic motors 138 and 148 each respectively power the drive to the axles 38, 42, 12, and 62. Referring to FIG. 3A, motor mounts 138A and 148A are slotted to receive respective motors 138 and 148.

Figure 3C:
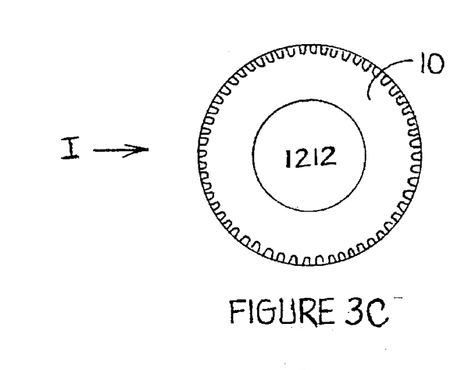
FIG. 3C is a from view of one of the wheels of the invention of FIG. 1A.
Figure 3D:
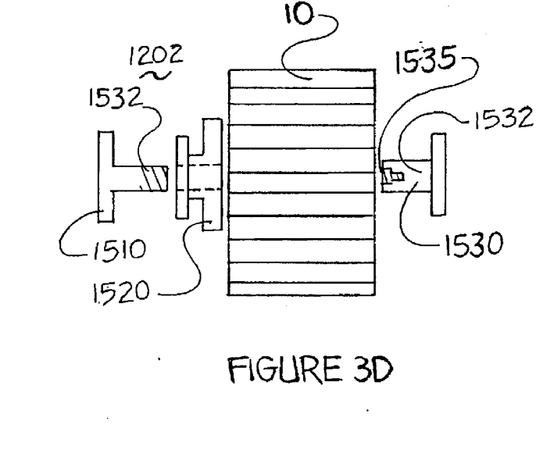
FIG. 3D is an exploded side view of the wheel of FIG. 3C along arrow I.

FIG. 3C is a front view of one of the wheels 10, 20 and 30 of FIG. 1A with internal hub-axle mounts 1212. FIG. 3D is an exploded side view of the wheel of FIG. 3C along arrow I. Referring to FIG. 3D, external bolt 1510 includes a threaded end 1512 that fits through a central opening (not shown) in washer/hub 1520. Nut cap 1530 having a protruding end 1532 that includes internal threads 1535 that mateably attach to like threads 1512 of bolt 1510. These components together form internal hub-axle mounts 1202, 1204, 1206, 1208, 1210 and 1212 shown in FIG. 3B.

Referring to FIG. 1A, component 600 refers to the combustion motor which operates the mobile hauler and can be a 20 horsepower motor with fuel supply 200. Although not shown an electric motor and the like can be substituted. Motor 600 powers a standard/conventional hydraulic pump and an alternators to charge the battery (all conventional and thus not shown). The engine/motor 600 uses approximately 0.6 gallons of gas per hour. The remaining components that make-up the Mobile Hauling Vehicle will now be described. Component 110 is a flat storage bed. Rectangular type frame 112 is composed of sideboards to hold materials such as but not limited to tools, hardware, debris and the like. Frame 112 rests on bed 110, the latter of which is used to haul loads and the like. Component 120 refers to front bumper portion and component 130 refers to a rear bumper portion of the vehicle. Component 200 refers to a gas or fuel tank with a control panel 210 (previously described) on the top thereof. An operator, not shown, controls the invention by walking behind.

Figure 4:
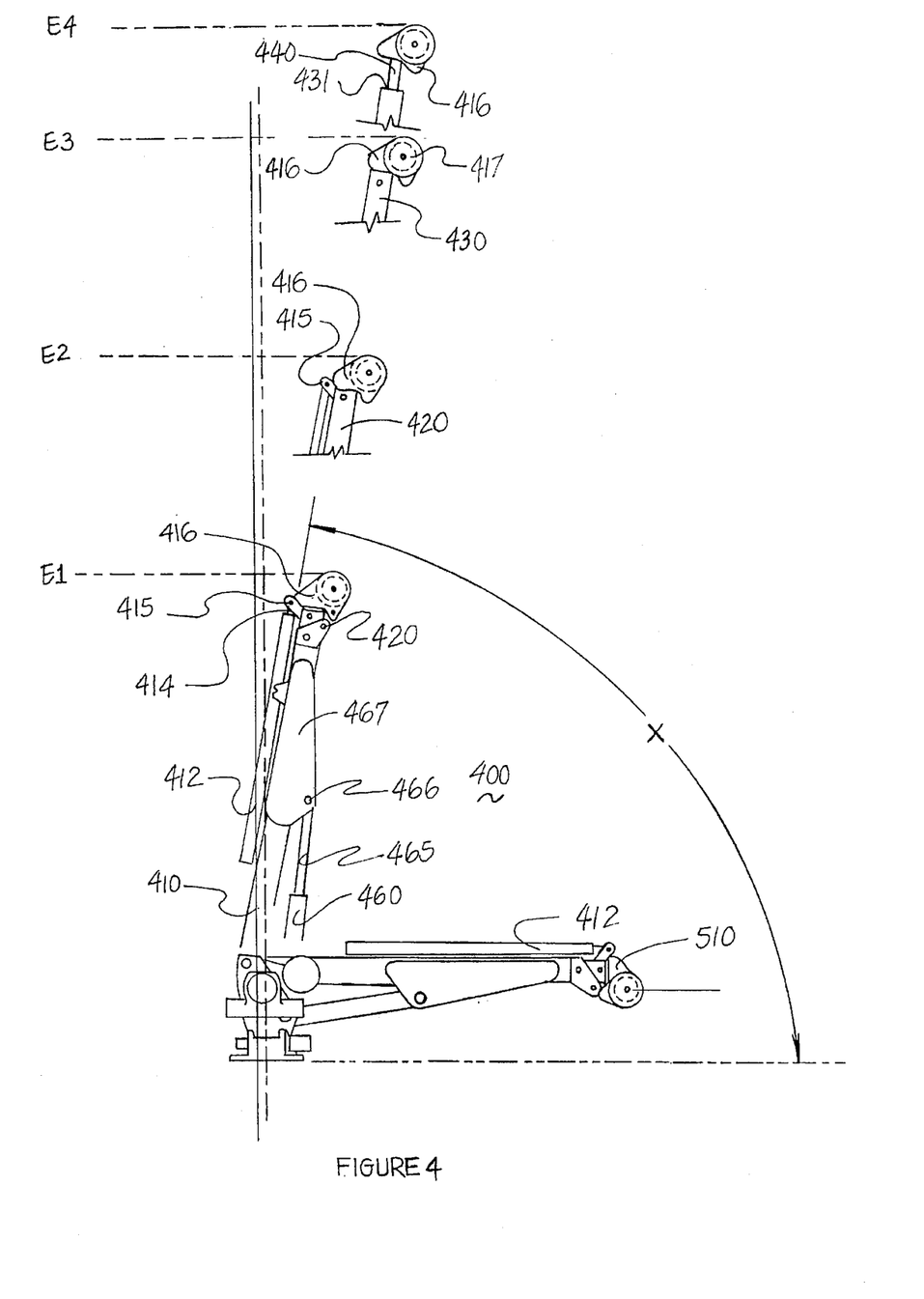
FIG. 4 shows the crane assembly of FIG. 1A in initial and extended positions.

The operation of the crane 400 will now be discussed in relation to FIGS. 1 and 4. 410 refers to telescoping outer tube which functions as a main beam for supporting a load at the end 510 of the crane 400. FIG. 4 illustrates the various extensions E1, E2, E3, and E4 of the crane 400. Component 412 is a first stage hydraulic extension cylinder. 414 is the piston within cylinder 412. Piston 414 has an outer end 415 which is attached to first extension hydraulic cylinder 420. Head piece 416 abuts against piston 414. Head piece 416 supports a conventional pulley type winch 417 and conventional cable/hook assembly 418 (shown in FIG. 6). 430 refers to the second extension hydraulic cylinder which comes out of end 421 of cylinder 420. Inside extension cylinder 430 is final piston extension 440 which comes out of end 431 of cylinder 420 which is attached to head piece 416. Component 460 refers to hydraulic cylinder for elevating crane 400 along angle X. Component 465 refers to hydraulic piston for raising telescoping tube 420 which is rotatably connected at pivot point 466 which in turn is connected to arm 467.

Figure 5:
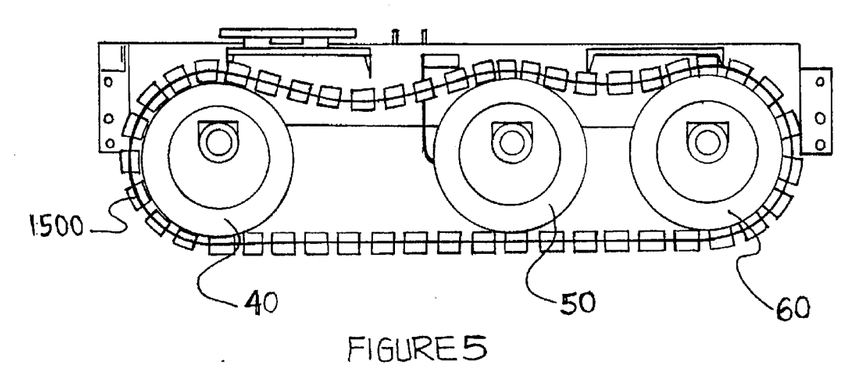
FIG. 5 is a side view of the wheel assembly of the invention of FIG. 1A with detachable tracks.

FIG. 5 is a side view of the wheel assembly of the invention of FIG. 1A with detachable tracks 1500 which can have a rounded interior curved surface, not shown, which allows the tracks to elastically and snugly fit about wheels 40, 50, 60.

Figure 6:
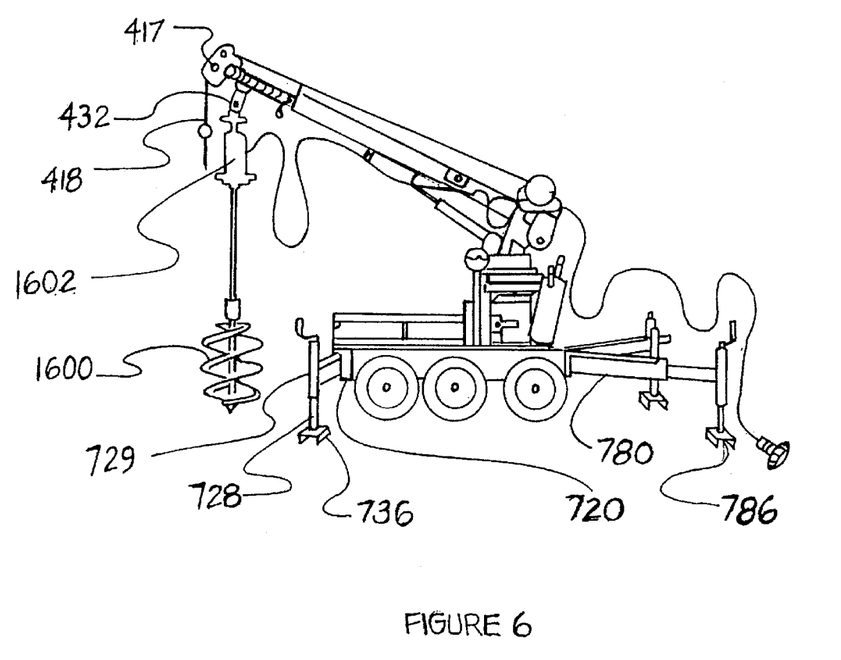
FIG. 6 is a side view the invention of FIG. 1 with detachable auger.

FIG. 6 is a side view the invention of FIG. 1 with detachable auger 1600 which has a connect type hook 1602 for attachment through socket 432, (better shown in FIG. 1A).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A self-propelled hauling vehicle comprising a main body frame with a front and a back, said frame having a dimension measured transversely of the front to back direction being controllably variable from approximately 34 to approximately 48 inches; a first set of wheels adjacent to the front of the body frame; a first independent means for rotating the first set of wheels a second set of wheels adjacent to the back of the body frame; a second independent means for rotating the second set of wheels; a third set of wheels located between the front and the back of the body frame; and a third independent means for rotating the third set of wheels.

2. The self-propelled hauling vehicle of claim 1, wherein the first independent means, the second independent means and the third independent means, each includes:

a drive chain.

3. The self-propelled hauling vehicle of claim 1, further comprising:

an outer set of wheels for attaching about each of the first, the second and the third set of wheels.

4. The self-propelled hauling vehicle of claim 1, further comprising:

attaching a set of tracks about the first, the second and the third set of wheels.

5. The self-propelled hauling vehicle of claim 1, further comprising:

a storage platform for storing materials to be hauled.

6. The self-propelled hauling vehicle of claim 1, further comprising:

a lifting crane attached to the main body frame.

7. The self-propelled hauling vehicle of claim 6, wherein the crane is controlled:

hydraulically.

8. The self-propelled hauling vehicle of claim 6, wherein the crane further includes:

a telescoping tubular member having plural extendable positions.

9. The self-propelled hauling vehicle of claim 6, further comprising:

a detachable drilling auger attached to a free end of the crane.

10. The self-propelled hauling vehicle of claim 6, further comprising:

a detachable hook means attached to a free end of the crane.

11. The self-propelled hauling vehicle of claim 1, further comprising:

a combustion engine for powering the vehicle.

12. The self-propelled hauling vehicle of claim 1, further comprising:

an electric engine for powering the vehicle.

13. A self propelled hauling vehicle of claim 1 wherein said first, second and third independent means includes a first and second motor, said first motor rotates one of said first and second and third set of wheels, and said second motor rotates one of said first and second and third set of wheels.

14. The self propelled hauling vehicle of claim 13 wherein one of said wheels of said first and second and third set of wheels are on the same side, another of said wheels of said first and second and third set of wheels are on the opposite side of said vehicle.

15. The self propelled hauling vehicle of claim 13 wherein said first and second motors are hydraulic motors.

16. The self propelled hauling vehicle of claim 15 further comprising a lifting crane attached to said main body frame, said lifting crane being controlled hydraulically, a hydraulic fluid source on said main body frame, said hydraulic fluid source being connected to said crane and said first and second motors.

17. A self propelled hauling vehicle comprising: a main body frame having a longitudinal dimension form a front portion to a back portion, the frame including a width dimension; said width dimension being controllably variable from approximately 34 to approximately 48 inches; a first set of wheels adjacent to the front of the body frame on opposite sides of the width dimension; a first independent means for rotating the first set of wheels a second set of wheels adjacent to the back of the body frame on opposite sides of the width dimension; a second independent means for rotating the second set of wheels; a third set of wheels located between the front and back of the body frame on opposite sides of the width dimension; a third independent means for rotating the third set of wheels; and a lifting crane attached to the main body frame having plural extended positions, wherein the vehicle includes a height dimension from ground level to an upper portion of the crane.

18. The self-propelled hauling vehicle of claim 17, wherein the longitudinal dimension is:

approximately seventy five inches.

19. The self-propelled hauling vehicle of claim 17, wherein the height dimension is:

approximately seventy-three inches.

20. The self-propelled hauling vehicle of claim 17, further including:

an overall weight component of approximately thirty-two hundred pounds.

21. A self propelled hauling vehicle of claim 17 wherein said first, second and third independent means includes a first and second motor, said first motor rotates one of said first and second and third set of wheels, and said second motor rotates one of said first and second and third set of wheels.

22. The self propelled hauling vehicle of claim 21 wherein one of said wheels of said first and second and third set of wheels are on the same side, another of said wheels of said first and second and third set of wheels are on the opposite side of said vehicle.

23. The self propelled hauling vehicle of claim 21 wherein said first and second motors are hydraulic motors.

24. A self-propelled hauling vehicle comprising:

a main body frame having a longitudinal dimension from a front portion to a back portion of approximately seventy-five inches, the frame including a width dimension that can be varied between thirty-four and forty eight inches;

a first set of wheels adjacent to the front of the body frame on opposite sides of the width dimension;

a first independent chain for rotating the first set of wheels a second set of wheels adjacent to the back of the body frame on opposite sides of the width dimension;

a second independent chain for rotating the second set of wheels;

a third set of wheels located between the front and the back of the body frame on opposite sides of the width dimension;

a third independent chain for rotating the third set of wheels;

an outer set of wheels for attaching about each of the first, the second and the third set of wheels; and a lifting crane with a telescopic tubular body, the crane having a base attached to the main body frame, wherein the vehicle includes a height dimension of approximately seventy-three inches from ground level to an upper portion of the crane.

25. The self-propelled hauling vehicle of claim 24, further including:

an overall weight component of approximately thirty-two hundred pounds.

* * * * *